Patented Nov. 7, 1933

1,934,656

UNITED STATES PATENT OFFICE 1,934,656

METHOD OF MAKING HYDROQUINONE

Edgar C. Britton, Shailer L. Bass and Norman Elliott, Midland, Mich., assignors to The Dow Chemical Company, Midland, Mich., a corporation of Michigan No Drawing. Application July 23, 1931
Serial No. 552,792

8 Claims. (Cl. 260—154)

The present invention is concerned with dihydric phenols, particularly with an improved method for preparing hydroquinone.

That compounds of the aforesaid type can be prepared by hydrolizing the dihalogenated benzenes is well known. To hydrolyze para-dichlorbenzene, for example, to form hydroquinone, is difficult, for the latter compound is known to be easily oxidized or otherwise changed. When such hydrolysis is attempted in the usual way, e. g. by reacting with aqueous caustic alkali under pressure, the conditions required to bring about such reaction are so intense that whatever hydroquinone may be formed is afterward largely destroyed. To overcome this difficulty it has been proposed to heat under pressure a sodium para-dihalobenzene-sulfonate with a 40 per cent aqueous caustic soda solution at a temperature of about 175° to 200° C. to produce the sodium salt of hydroquinone, from which hydroquinone is recovered by adding hydrochloric acid and then extracting. Times ranging from 12 to 25 hours or longer were required by which a yield of 50 per cent of hydroquinone is claimed to have been obtained. Another method, wherein various halogenated phenolic compounds are heated with aqueous solutions of the alkaline earth hydroxides, under pressure, at temperatures from 150° to 220° C. and in the presence of catalysts such as copper or iodine salts over periods of time of from 6 to 24 hours, has also been proposed. Such latter method, however, has never been used commercially for making hydroquinone.

In German Patent No. 269,544 to Boehringer et al. (1911) is disclosed a method for making hydroquinone and the like by reacting mono-halogenated phenols with concentrated (30 to 40 per cent) aqueous solutions of caustic soda or caustic potash. In such disclosure when hydrolyzing para-chlorphenol with 10 to 12 molecular ratios of a 30 to 40 per cent caustic potash solution at temperatures of 190° C., employing metallic copper as catalyst, and reacting for a period of time of 9 to 12 hours, a yield of hydroquinone of 74 per cent was said to have been obtained. The hydrolysis of para-bromphenol by use of 30 per cent NaOH at 195° C. for 12 hours of time is also suggested in the patent, but the results of such experiments are not given.

To verify the yields claimed in the foregoing patent disclosure, the present inventors have reproduced the conditions described therein. The yield of hydroquinone obtained from parachlorphenol by these experiments was 34 per cent. A considerable quantity of tar was also formed. When para-bromphenol was used under the conditions given, a yield of 50.8 per cent of hydroquinone was obtained. A considerable quantity of tar was formed during such treatment. With such high temperatures and concentrations employing iron or copper as catalysts and such extended times for reacting, the hydroquinone was found to have been largely destroyed.

While it is commonly known that the ease of replacement of the different halogens in the halogenated phenols increases with the particular halogen used in the order, namely, chlorine to bromine to iodine, yet there has been a general misconception concerning the relative ease with which two such different halogens are replaceable. We have found that the conditions of hydrolysis adapted to replace chlorine in para-chlorphenol are unnecessarily drastic when employed for replacing bromine in para-bromphenol. For instance, when para-chlorphenol was heated in a copper reactor at 150° C. with a solution containing three molecular proportions of sodium hydroxide in 10 per cent concentration for a period of two hours the yield of hydroquinone obtained was less than one per cent (0.8). The conditions necessary to employ, therefore, for hydrolyzing para-chlorphenol to hydroquinone are elevated temperatures (150° to 230° C.), high concentrations of caustic soda (30 per cent or above), higher molecular ratios of caustic soda (10 to 12 moles), and long time of heating (9 to 12 hours), and in the presence of metallic copper or copper salts and under pressure. Under such conditions of reaction, however, hydroquinone decomposes rapidly and high yields thereof cannot be obtained.

We have now found that when para-bromphenol is heated with dilute aqueous alkali metal hydroxide in the presence of metallic copper under certain mild conditions of reaction that hydroquinone is obtained in satisfactory yields. Such conditions of reacting are, namely (1) lowered temperatures, 75° to 150° C.; (2) low molecular ratio of alkali-metal hydroxide, 3 to 5 moles; (3) low hydroxide concentration in the reaction solution, 5 to 15 per cent; (4) and short time of heating, approximately 1 to 2 hours. Our improved method, then, consists of the step or steps hereinafter fully described and particularly pointed out in the claims, the following description setting forth in detail several modes of carrying out the invention, such disclosed modes illustrating, however, but several of the various ways in which the principle of the invention may be used.

In proceeding according to the invention, in general, the method consists in heating at a given temperature a mixture of para-bromphenol and an aqueous alkali metal hydroxide solution in the presence of metallic copper or cuprous oxide in a suitable iron, copper, or other metal reactor or autoclave. Although a fairly wide range of temperature is suitable in carrying out our method, viz., approximately 75° to 150° C. yet a preferable temperature for reacting lies around 115° to 125° C. At a temperature less than 100° C., with a given concentration of hydroxide, the time of reaction will need to be extended. However, at temperatures of 75° C., or lower even, substantial yields of hydroquinone are obtained. At temperatures in excess of the higher range of temperature, i. e. approximately 150° C., decomposition of the hydroquinone increases in most instances to such a degree as to render the process generally impracticable. From numerous trials using various alkali metal hydroxide concentrations, it was found most advantageous to employ the alkali metal hydroxide in a molecular ratio between about 3 and about 5, based on 1 mole of para-bromphenol being used, and said alkali metal hydroxide is best employed as a 5 to 15 per cent aqueous solution thereof. An alkali solution concentration of around 10 per cent seems most advantageous to use. Time of reaction employing the above enumerated conditions will vary from about 1 to 2 hours, with a good conversion of the para-bromphenol. We may operate under pressure, that is, a pressure greater than the normal vapor pressure of the reaction mixture at a given temperature. However, such condition is not necessary to the carrying out of the reaction. To obtain the desired contacting of the reacting solution with the catalyst when reacting by the batch method, strong agitation is helpful and may be effected in any well known manner. At the completion of a run the hydroquinone may be separated from the reaction mixture by any convenient method. Such a method for separating hydroquinone consists in first treating the reaction mixture to slight acidity with sulphur dioxide and blowing with steam to remove unreacted para-bromphenol. The reaction mixture is then treated with lime to a substantially neutral reaction and calcium bromide solution added with stirring and heating until the sodium sulfites have been converted to sodium bromide and insoluble normal calcium sulfite. The latter may then be filtered off in the regular way. By now evaporating the filtrate to a given concentration, and cooling, the hydroquinone crystallizes and may be filtered out and purified by crystallizing from chlorobenzene or other suitable solvent. The mother liquor therefrom, containing principally sodium bromide, may be further concentrated and the sodium bromide removed. Our improved method for making hydroquinone is particularly adapted to reacting in a continuous or tubular reactor, wherein a close temperature and time control and intimate mixing of the reactants may be had. When such reactor is employed the reaction mixture therefrom may be discharged in a reducing atmosphere and separated as described above.

The following examples will illustrate various ways of performing our method:—

*Example 1*

110 parts of para-bromphenol, 89.0 parts of sodium hydroxide, the latter representing a molecular ratio of about 3½ to 1 of the former compound, and sufficient water to dilute the sodium hydroxide to approximately a 15 per cent solution thereof, was charged into a copper lined reactor, equipped with means for mechanical stirring, temperature control and measurement and also for heating. The charge was then heated for two hours, the temperature being maintained at 115° C. The reaction product was neutralized with sulphur dioxide and then blown with steam to remove unreacted para-bromphenol, 43 per cent of that charged being thus recovered, and then treated with slaked lime until just neutral, and calcium bromide silution then added with heating until all the sodium sulfite and bisulfite had been converted to sodium bromide and normal calcium sulfite. The latter was then filtered off and the hydroquinone recovered from the filtrate by evaporating it to such a concentration that, on cooling, hydroquinone crystallized out. The product was further purified by crystallization from chlorobenzene. Hydroquinone crystals, light yellow in color and with a melting point of 172° C., were obtained in 42.2 per cent of the theoretical yield, based on the quantity of para-bromphenol used, and in 74 per cent of the theoretical yield, based on the quantity of para-bromphenol reacted.

*Example 2*

A charge consisting of 110 parts of para-bromphenol, 127 parts of sodium hydroxide, which represents approximately 5 molecular ratios with respect to the para-bromphenol, and sufficient water to dilute the sodium hydroxide to approximately a 10 per cent solution thereof, was charged into the reactor used in Example 1. The charge was heated at a temperature of approximately 125° C. for two hours. The reaction mixture was then acidified and steamed out to remove the unreacted para-bromphenol, which amounted to about 13 per cent of that material originally taken. The reaction mixture was then further treated as described in Example 1 and the hydroquinone separated therefrom and crystallized from chlorobenzene. A yield of approximately 61.0 per cent of hydroquinone was obtained, calculated on the basis of the para-bromphenol originally taken. A 70 per cent yield of hydroquinone was thereby obtained on the para-bromphenol reacted.

*Example 3*

Into a steel reactor of substantially similar construction to that used in Examples 1 and 2, was measured 110 parts of para-bromphenol, 127 parts of sodium hydroxide, which corresponds to about 5 molecular ratios with respect to said phenol, 9 parts cuprous oxide ($Cu_2O$) and water in an amount to make up the sodium hydroxide to a 10 per cent solution thereof. The reaction batch was then heated for two hours at a temperature of 125° C. Unreacted para-bromphenol was first separated from the above reaction mixture by acidifying with sulphur dioxide and steaming, 23.6 per cent of the para-bromphenol being thus recovered. The reaction mixture was then treated as in Example 1. The crystals of hydroquinone obtained were in 65.5 per cent yield calculated on the quantity of para-bromphenol reacted.

*Example 4*

Into a 5-liter, round-bottom flask provided with a mechanical stirrer, a thermometer and a reflux condenser was measured 288 parts of para-bromphenol, 14.4 parts of copper bronze and sufficient water to dissolve the sodium hydroxide as a 10 per cent solution thereof. The mixture was stirred and the temperature of the same maintained at 75° C. during a period of 24 hours. Titration of an aliquot portion of the reaction solution for bromide proved a 19.4 per cent hydrolysis to have been effected. The mixture was acidified with sulfur dioxide, the unchanged para-bromphenol extracted with carbon tetracloride, and finally the hydroquinone was removed from the residual aqueous liquor by extracting the same with ether. Upon evaporating the ether extract to dryness and recrystallizing the residue from monochloro-benzene, there was obtained 18.5 parts of hydroquinone having a melting point of 174° C. The yield of hydroquinone was 10.1 per cent, based on the para-bromphenol used and 51.5 per cent of theoretical, based on the amount of para-bromphenol hydrolyzed.

Example 5

Into a reactor similar to that described in Example 1 were placed 110 parts of para-bromphenol and an aqueous, 10 per cent sodium hydroxide solution which contained 76.2 parts of sodium hydroxide (3 moles of sodium hydroxide per mole of para-bromphenol). The bomb was heated to a temperature of 150° C. during a period of 1 hour. The reaction mixture was then acidified with sulfur dioxide, the unreacted para-bromphenol removed from said mixture by extracting the same with benzene and finally the hydroquinone was isolated by extracting the aqueous liquor with ether, evaporating the ether extract to dryness and recrystallizing the product from monochloro-benzene. There was obtained a 16.7 per cent recovery of unreacted para-bromphenol and a 44.3 per cent yield of hydroquinone based on the amount of para-bromphenol used.

Example 6

A solution consisting of 110 parts of para-bromphenol and an aqueous, 15 per cent sodium hydroxide solution containing 89 parts of pure sodium hydroxide (3.5 moles of sodium hydroxide per mole of para-bromphenol) was passed, under a pressure greater than the vapor pressure of the reaction mixture, through a copper coil heated throughout to the constant temperature 115° C., the charge being admitted to and the reacted liquor withdrawn from the coil continuously and each at the same rate. The rate at which the charge was passed through the copper reactor was such that each part of the former was heated to the above mentioned temperature for a period of 2 hours. The reaction liquor so obtained was neutralized with sulfur dioxide and then blown with steam to remove unreacted para-bromphenol, 43 per cent of the latter material being thus recovered. Hydroquinone was recovered from the residual liquor in a way similar to that described in example 1. The yield of hydroquinone was 74 per cent of theoretical based on the para-bromphenol reacted.

In the foregoing examples, the aqueous sodium bromide mother liquor obtained from the step wherein the hydroquinone product is removed from the reaction mixture by extraction, or by crystallization, may be treated by well known methods such as reacting with chlorine and recovering the bromine. The calcium sulfite may be treated with an acid, as HCl, to regenerate $SO_2$, which may be reused to treat another reactor batch. The sodium hydroxide may contain appreciable amounts of impurities usually associated with the manufacture thereof such as carbonate, chloride and the like. In fact, we may employ sodium hydroxide containing a considerable percentage of sodium carbonate and with satisfactory results. Potassium hydroxide may also be employed as the hydrolyzing agent in our method.

As a preferred hydrolytic catalyst we employ metallic copper, copper bronze powder, or cuprous oxide. Other suitable hydrolytic catalysts may also be found convenient to use. Although the manufacture of the para-bromphenol employed in carrying out our method is not directly pertinent thereto, yet, of the halogenated phenols that might theoretically be hydrolyzed to form hydroquinone, para-bromphenol of the desired purity is the most easily produced in satisfactory yields. For instance, para-bromphenol of high quality can be produced in yields up to 95 per cent from phenol whereas the best yields of para-chlorphenol thus derived are about 60 per cent. The chloro compound thus obtained is also impure and is troublesome to purify.

In summation, our improved method for making hydro-quinone is characterized by the hydrolysis of para-bromphenol under conditions so that an "activating" group such as the sulfonic acid group ($—SO_3H$) need not be first introduced into the para-bromphenol molecule in order to facilitate the replacement of the halogen molecule thereof. We also perform such hydrolysis under conditions so mild that no "activating" group is necessary to prevent rearrangement reactions or to inhibit oxidation reactions. A summary of the conditions as indicated sets forth a method which consists in hydrolyzing para-bromphenol with a 5 to 15 per cent aqueous sodium hydroxide solution containing 3 to 5 molecular ratios thereof with respect to the para-bromphenol in the presence of metallic copper or a cuprous compound, at a temperature of approximately 75° to 150° C. Such hydrolysis may be performed in 1 to 2 hours, at temperatures between 115° and 150° C., and with or without pressure. It is noted that the aforesaid conditions that obtain in reacting according to our improved process make the same particularly adapted to be carried out in a continuous tubular reactor. By thus reacting a high yield of a pure product is obtained.

Other modes of applying the principle of our invention may be employed instead of those explained, change being made as regards the method herein disclosed, provided the means stated by any of the following claims or the equivalent of such stated means be employed.

We therefore particularly point out and distinctly claim as our invention:—

1. The method of preparing hydroquinone, which comprises hydrolyzing para-bromphenol with an aqueous alkali metal hydroxide solution at a temperature between 75° and 150° C.

2. The method of preparing hydroquinone, which comprises hydrolyzing para-bromphenol by heating the same at a temperature between 75° and 150° C. and in the presence of a hydrolytic catalyst with from 3 to 5 molecular equivalents of a 5 to 15 per cent aqueous alkali metal hydroxide solution.

3. The method of preparing hydroquinone, which comprises hydrolyzing para-bromphenol by heating the same at a temperature between 75° and 150° C. and in the presence of a copper hydrolytic catalyst with from 3 to 5 molecular equivalents of a 5 to 15 per cent aqueous sodium hydroxide solution.

4. The method of preparing hydroquinone, which comprises hydrolyzing para-bromphenol by heating the same at a temperature between 75° and 150° C. and in the presence of metallic copper with from 3 to 5 molecular equivalents of a 5 to 15 per cent aqueous sodium hydroxide solution.

5. The method of preparing hydroquinone, which comprises hydrolizing para-bromphenol by heating the same, under pressure, at a temperature between 75° and 150° C. and in the presence of metallic copper with from 3 to 5 molecular equivalents of a 5 to 15 per cent aqueous sodium hydroxide solution.

6. In a method of preparing hydroquinone, the steps which consist of hydrolizing para-bromphenol by heating the same at a temperature between 75° and 150° C. and in the presence of metallic copper with from 3 to 5 molecular equivalents of a 5 to 15 per cent aqueous sodium hydroxide solution to obtain a reaction mixture containing hydroquinone, acidifying, steaming said reaction mixture to remove therefrom unreacted para-bromphenol and separating the hydroquinone.

7. In a method of preparing hydroquinone, the steps which consist of hydrolizing para-bromphenol by heating the same, under pressure, at a temperature between 75° and 150° C. and in the presence of metallic copper, with from 3 to 5 molecular equivalents of a 5 to 15 per cent aqueous sodium hydroxide solution to obtain a reaction mixture containing hydroquinone, acidifying to a slightly acid reaction with sulphur dioxide, steaming said reaction mixture to remove therefrom unreacted para-bromphenol, heating the reaction mixture with an aqueous solution of calcium bromide to convert the sulfites thereof to insoluble calcium sulfite and sodium bromide, removing the insoluble sulfite, heating filtrate to concentrate same, cooling to induce crystallization of the hydroquinone, separating the latter and purifying by recrystallizing from chlorobenzene.

8. A continuous method for preparing hydroquinone, which comprises causing a mixture consisting of para-bromphenol, a copper hydrolytic catalyst, and from 3 to 5 equivalents of a 5 to 15 per cent sodium hydroxide solution to traverse a zone in which the same is heated at a temperature between 75° and 150° C. under a pressure greater than the vapor pressure of the mixture, whereby a reaction takes place with formation of hydroquinone, continuously discharging the reacted mixture, acidifying the same and separating hydroquinone therefrom.

EDGAR C. BRITTON.
SHAILER L. BASS.
NORMAN ELLIOTT.